United States Patent
Baughman et al.

(10) Patent No.: US 10,032,448 B1
(45) Date of Patent: Jul. 24, 2018

(54) DOMAIN TERMINOLOGY EXPANSION BY SENSITIVITY

(71) Applicant: INTERNATIONAL BUSINESS MACHINES CORPORATION, Armonk, NY (US)

(72) Inventors: Aaron K. Baughman, Silver Spring, MD (US); Stephen C. Hammer, Marietta, GA (US); Christopher Eythan Holladay, Marietta, GA (US); David A. Provan, Acworth, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/400,169

(22) Filed: Jan. 6, 2017

(51) Int. Cl.
*G10L 15/06* (2013.01)
*G10L 15/02* (2006.01)
*G06F 17/27* (2006.01)
*G10L 15/18* (2013.01)

(52) U.S. Cl.
CPC .......... *G10L 15/063* (2013.01); *G06F 17/274* (2013.01); *G06F 17/2705* (2013.01); *G06F 17/277* (2013.01); *G06F 17/2735* (2013.01); *G06F 17/2795* (2013.01); *G10L 15/02* (2013.01); *G10L 15/18* (2013.01); *G10L 2015/0635* (2013.01)

(58) Field of Classification Search
USPC ........................................ 704/1–10, 230–275
See application file for complete search history.

(56) References Cited

U.S. PATENT DOCUMENTS

| | | |
|---|---|---|
| 2005/0278325 A1 | 12/2005 | Mihalcea et al. |
| 2007/0106499 A1 | 5/2007 | Dahlgren et al. |
| 2008/0086363 A1 | 4/2008 | Kass et al. |
| 2008/0275694 A1 | 11/2008 | Varone |
| 2012/0232885 A1* | 9/2012 | Barbosa ............... G06F 17/2715 704/9 |
| 2013/0275272 A1 | 10/2013 | Begin, Jr. et al. |
| 2015/0161241 A1 | 6/2015 | Haggar et al. |
| 2015/0170057 A1 | 6/2015 | Allen et al. |

(Continued)

FOREIGN PATENT DOCUMENTS

CN      1608259 B      10/2010

OTHER PUBLICATIONS

Rosenblum, James A., "Identifying Relevant Prior Explanations", Jun. 1993 ACL '93: Proceedings of the 31st Annual Meeting on Association for Computational Linguistics, Association for Computational Linguistics, pp. 277-279.

(Continued)

*Primary Examiner* — Huyen Vo
(74) *Attorney, Agent, or Firm* — Christopher K. McLane, Esq.; Hye Jin Lucy Song; Heslin Rothenberg Farley & Mesiti, P.C.

(57) ABSTRACT

Methods, computer program products, and systems are presented. The methods include, for instance: determining that one or more word of a feature vector more supports than negates a language model corresponding to the domain based on a sensitivity of respective word. Words having acceptable sensitivities are added to the language model, and the language model is enhanced by use of machine learning in order to accurately and comprehensively model the language specific for the domain.

20 Claims, 8 Drawing Sheets

(56) References Cited

U.S. PATENT DOCUMENTS

2015/0332670 A1* 11/2015 Akbacak ............... G10L 15/063
  704/9
2015/0370784 A1* 12/2015 Nissan ................ G06F 17/2809
  704/2

OTHER PUBLICATIONS

Cross, Edward M., "Behavioral Styles of Computer Programmers—Revisited", Jun. 1971, SIGCPR '71: Proceedings of the Ninth Annual SIGCPR Conference, ACM, pp. 140-166.

Rouas, Jean-Luc, "Automatic Prosodic Variations Modeling for Language and Dialect Discrimination", IEEE Transactions on Audio, Speech, and Lanuage Processing, vol. 15, No. 6, Aug. 2007, pp. 1904-1911.

Elara, Mohan Rajesh, et al. "Design Principles For Robot Inclusive Spaces: A Case Study With Roomba", 2014 IEEE International Conference on Robotics and Automation (ICRA), Hong Kong, China, May 31, 2014-Jun. 7, 2014, pp. 5593-5599.

Mell, Peter, et al., "The NIST Definition of Cloud Computing", NIST Special Publication 800-145, Sep. 2011, Gaithersburg, MD, 7 pgs.

List of IBM Patents or Applications Treated as Related, Jan. 6, 2017, pp. 1-2.

"Domain Terminology Expansion by Relevancy", U.S. Appl. No. 15/399,843, filed Jan. 6, 2017, pp. 1-43.

Office Action in U.S. Appl. No. 15/399,843, filed Nov. 22, 2017, 30 pgs.

Barber, et al. "In-Memory BLU Acceleration in IBM's DB2 and dashDB: Optimized for Modern Workloads and Hardware Architectures", IEEE 2015, pp. 1246-1252.

* cited by examiner

EQ. 1
$$S_{dd}(h_i) = \frac{\log(df_i + 1) \times (1 + \frac{e^{df_i}}{e^{\max(df_i)}})}{\log(\max(df_i) + 1) \times 2}$$

EQ. 2
$$hypernym_e = \sum_i^{|\bar{h}|} S_{dd}(h_i) \times e^{\frac{-i}{|\bar{h}|/2}}$$

EQ. 3
$$negating_{LM} = \frac{1}{N} \sum_i^{|evd|} (1 - hypernym_i)$$

EQ. 4
$$supporting_{LM} = \frac{1}{N} \sum_i^{|evd|} hypernym_i$$

EQ. 5
$$\alpha \times negating_{LM} + (1 - \alpha) \times supporting_{LM}$$

FIG. 5

DOMAIN TERMINOLOGY EXPANSION BY SENSITIVITY

TECHNICAL FIELD

The present disclosure relates to domain language modeling technology, and more particularly to methods, computer program products, and systems for improving accuracy and range of domain corpus.

BACKGROUND

In conventional language modeling, measuring a probability of a word sequence to be within a context is based on n-grams frequency counts. In adapting a language model to a domain, the meaning of word sequence may become ambiguous and accordingly may result in inaccurate language model for the domain.

SUMMARY

The shortcomings of the prior art are overcome, and additional advantages are provided, through the provision, in one aspect, of a method. The method for expanding a language model corresponding to a domain includes, for example: determining, by one or more processor, that one or more word of a feature vector more supports than negates a language model corresponding to the domain based on a sensitivity of respective word; adding the one or more word to the language model, wherein the language model is stored in a corpora coupled to a cloud; and enhancing the language model by machine learning such that the language model accurately and comprehensively facilitates an automatic speech recognition (ASR) system for the domain.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 lists equations formulating the inclusion test of FIG. 4, in accordance with one or more embodiments set forth herein;

DETAILED DESCRIPTION

Figure 1:
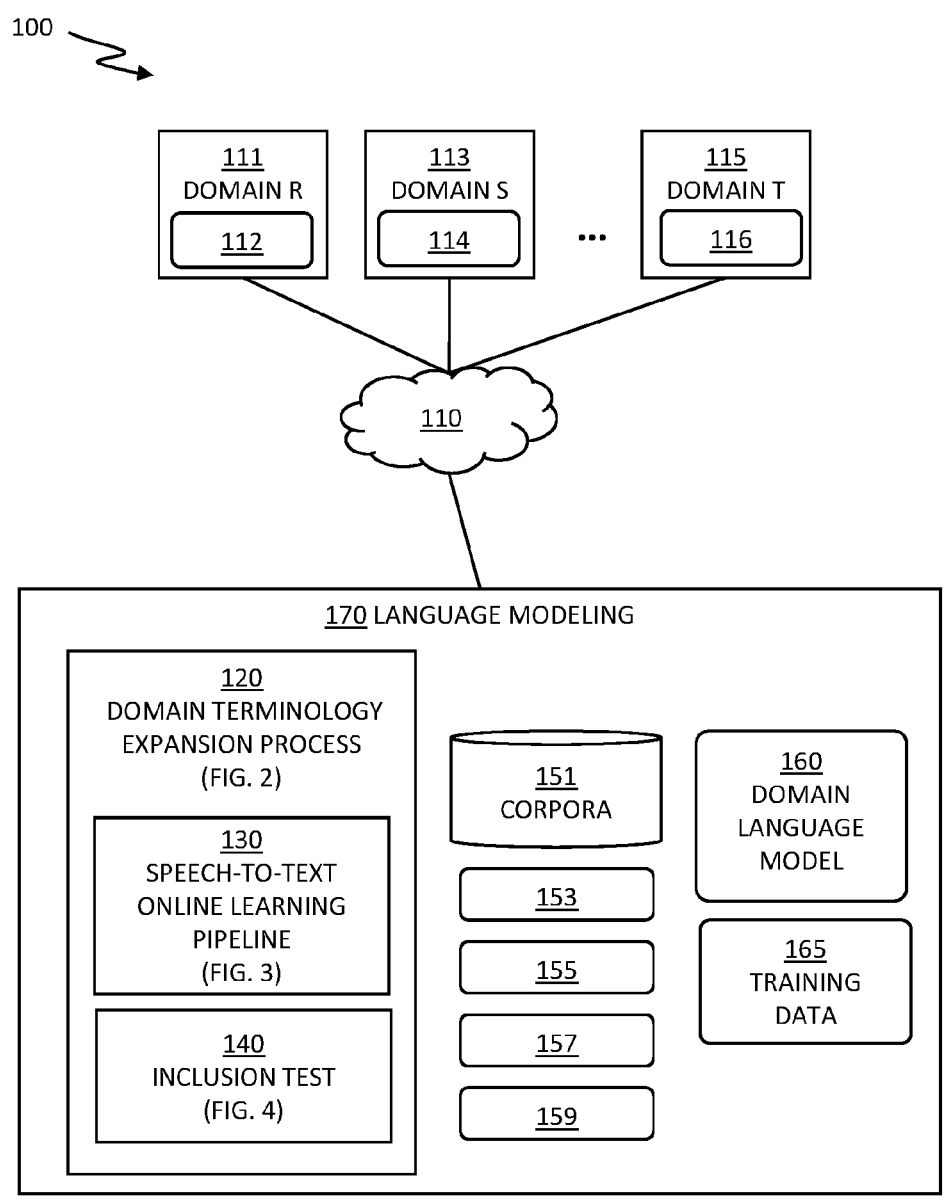
FIG. 1 depicts a system for coerced expansion of domain terminology, in accordance with one or more embodiments set forth herein.

FIG. 1 depicts a system 100 for coerced expansion of domain terminology, in accordance with one or more embodiments set forth herein.

The system 100 includes multiple domains 111, 113, 115, and a language modeling process 170 interconnected via a cloud 110. In this specification, a domain that invokes the language modeling process 170 is referred to as a target domain, which is selected from the multiple domains 111, 113, and 115. From the perspective of the target domain, the rest of domains are referred to as external domains.

The system 100 adapts a language model to the target domain of the multiple domains, 111, 113, and 115, as well as expands a domain terminology by selectively including words from other domains and/or live content, which is driven by the respective relevancy of each word to the domain terminology of the target domain. A word is coerced into the domain terminology of the target domain, represented by a domain language model 160, if the word has a relevancy higher than a preconfigured threshold with the target domain. Accordingly, word disambiguation is also achieved by relevancy assessment and coerced expansion of the domain terminology. Consequently, the domain language model 160 and the domain terminology represented by the domain language model 160 would be comprehensive in extent and accurate in applicability for the target domain, and would be able to more effectively facilitate an Automatic Speech Recognition (ASR) system for the target domain than conventional language model and domain terminologies.

Domain R 111, Domain S 113, and Domain T 115 represent respective domain specifying a subject field of interest, such as tennis, golf, food, politics, etc. Domain R 111, Domain S 113, and Domain T 115 may include static domain dictionaries 112, 114, 116, respectively, that define terms in the context of the respective subject field for each domain such as a tennis dictionary, golf glossaries, food terms, politics jargons, etc. Each of the multiple domains 111, 113, 115 may independently utilize the language modeling process 170 in order to adapt respective language model to each domain and to expand respective domain terminology, which is represented as respective domain corpus in the corpora 151.

The language modeling process 170 represents elements necessary to practice coerced expansion of domain terminology for the target domain as described in this specification. The language modeling process 170 includes a domain terminology expansion process 120, a corpora 151, utility processes such as a live content crawler 153, a relevancy assessment process 155, natural language processing (NLP) components 157, and the Natural Language Toolkit (NLTK) 159. The language modeling process 170 further includes a domain language model 160 and training data 165.

The domain language model 160 corresponds to the target domain. The domain language model 160 is a probabilistic language model that is adapted to the target domain. Each word in the domain language model 160 is associated with a respective conditional probability for the word to be meaningful in the domain terminology, which is estimated based on a sequence of preceding words. The domain language model 160 is a dynamic language model which dynamically modifies conditional probabilities of respective words depending on a recent word history.

A word sequence, indicating a sequence of one or more word, may be included in more than one domain terminology wherein the word sequence has respective domain-dependent meanings. For example, a word sequence "get an ace", or "ace", may be included in Tennis corpus as the word sequence may be a tennis term which has a specific meaning within the context of tennis. The same word sequence "get an ace", or "ace", may be included in Cards corpus and Golf corpus as the word sequence may have respectively specific meanings within the context of card games and the context of golf, respectively.

The domain terminology expansion process 120 expands a target domain terminology, indicating the domain terminology of the target domain. The target domain terminology is stored in a target domain corpus, which is a domain corpus corresponding to the target domain. The domain terminology expansion process 120 collects live content from subject data sources respective to the target domain in expanding the target domain terminology. The domain terminology expansion process 120 may further use word sequences from external domain corpuses corresponding to domain terminologies respective to the external domains in expanding the target domain corpus if the word sequences are determined to be relevant to the target domain terminology. The domain terminology expansion process 120 includes a speech-to-text online learning pipeline process 130 and an inclusion test process 140. Details on operations of the domain terminology expansion process 120 are presented in FIG. 2 and corresponding description. The speech-to-text online learning pipeline process 130 is a process progressively building up and enriching a domain terminology by use of natural language processing and machine learning. Details on operations of the speech-to-text online learning pipeline process 130 are presented in FIG. 3 and corresponding description. The inclusion test process 140 systematically determines whether or not to include certain content in the domain terminology. Details on operations of the inclusion test process 140 are presented in FIG. 4 and corresponding description.

The corpora 151 of the language modeling process 170 indicates a group of domain corpuses that represents respective domain terminology specific to respective domain. In certain embodiments of the present invention, the corpora 151 may be implemented by use of an external relational database system. The corpora 151, as well as the utility processes 153, 155, 157, and 159, may be independently accessed by multiple threads of the domain terminology expansion process 120.

The live content crawler 153 of the language modeling process 170 performs data mining on live content of subject sites that are associated with the target domain. The live content crawler 153 is preconfigured to extract specific features associated with the target domain from the live content, which are conducive to expand a target corpus corresponding to the target domain. Examples of live content subject to crawling may include, but are not limited to, motion data, streaming data, live feed from events, etc., which are constantly updated at the subject sites. In case of the target domain for a specific sports event, examples of the live content may include, but are not limited to, status and biographical information on players, acronyms, game rules and glossaries, articles, interview clips, live feed of a game, manually corrected Web Video Text Tracks (WebVTT), or similar data that are updated as necessary to keep the content of the website up-to-date. The live content crawler 153 functions as a conventional web spiders or web robots that automatically and systematically browses interested web sites. Certain embodiments of the present invention implements the live content crawler 153 in the Python® programming language. (Python is a registered trademark of the Python Software Foundation in the United States and other countries.)

The relevancy assessment process 155 of the language modeling process 170 assesses relevancy of subject data to the target domain corpus before, during and after lexical analysis of the subject data. Data subject to the relevancy assessment may include the live content collected by use of the live content crawler 153 and relevant words thereof as expanded by the domain terminology expansion process 120. The relevancy assessment process 155 may be pre-trained by the static domain dictionaries, 112, 114, and 116, of each domain to determine respective relevancies of the subject data in the speech-to-text online training process 130.

In certain embodiments of the present invention, the relevancy assessment process 155 is implemented by use of an external retrieval and assessment service in order to determine how relevant a word is to the target domain terminology, as represented in the target language model. In the same embodiment, within the speech-to-text online learning pipeline 130, the same external retrieval and assessment service also trains the domain language model 160 for the target domain by machine learning in order to rank terms of the target domain based on the respective relevancies of the terms. The same external retrieval and assessment service subsequently evaluates the domain language model 160 for the target domain within the same speech-to-text online learning pipeline 130.

The natural language processing (NLP) component 157 of the language modeling process 170 collectively refers to numerous natural language processing (NLP) services such as language detection and grammar check, language translation, and speech to text conversion and vice versa, etc. In certain embodiments of the present invention, the NLP component 157 is implemented by use of numerous customary NLP tools as well as external NLP tools.

The Natural Language Toolkit (NLTK) 159 of the language modeling process 170 is a publicly available, open-source suite of libraries and programs for symbolic and statistical natural language processing (NLP) for English written in the Python programming language. In certain embodiments of the present invention, the domain terminology expansion process 120 utilizes a part-of-speech (POS) tagger, WordNet, VerbNet, etc., in order to discover related terms derived from the live content such that the related terms may be individually examined for relevancy in determining whether or not to include the related terms in the target domain terminology.

The training data 165 is generated from all subject data examined by the domain terminology expansion process 120, in order to train the domain language model 160. If the subject data is determined to be relevant enough to be in the domain language model 160, then the subject data is tagged as an evidence supporting the domain language model 160 for the target domain. If the subject data is determined not to be relevant enough to be in the domain language model 160, then the subject data is tagged as an evidence negating the domain language model 160 for the target domain.

Figure 2:
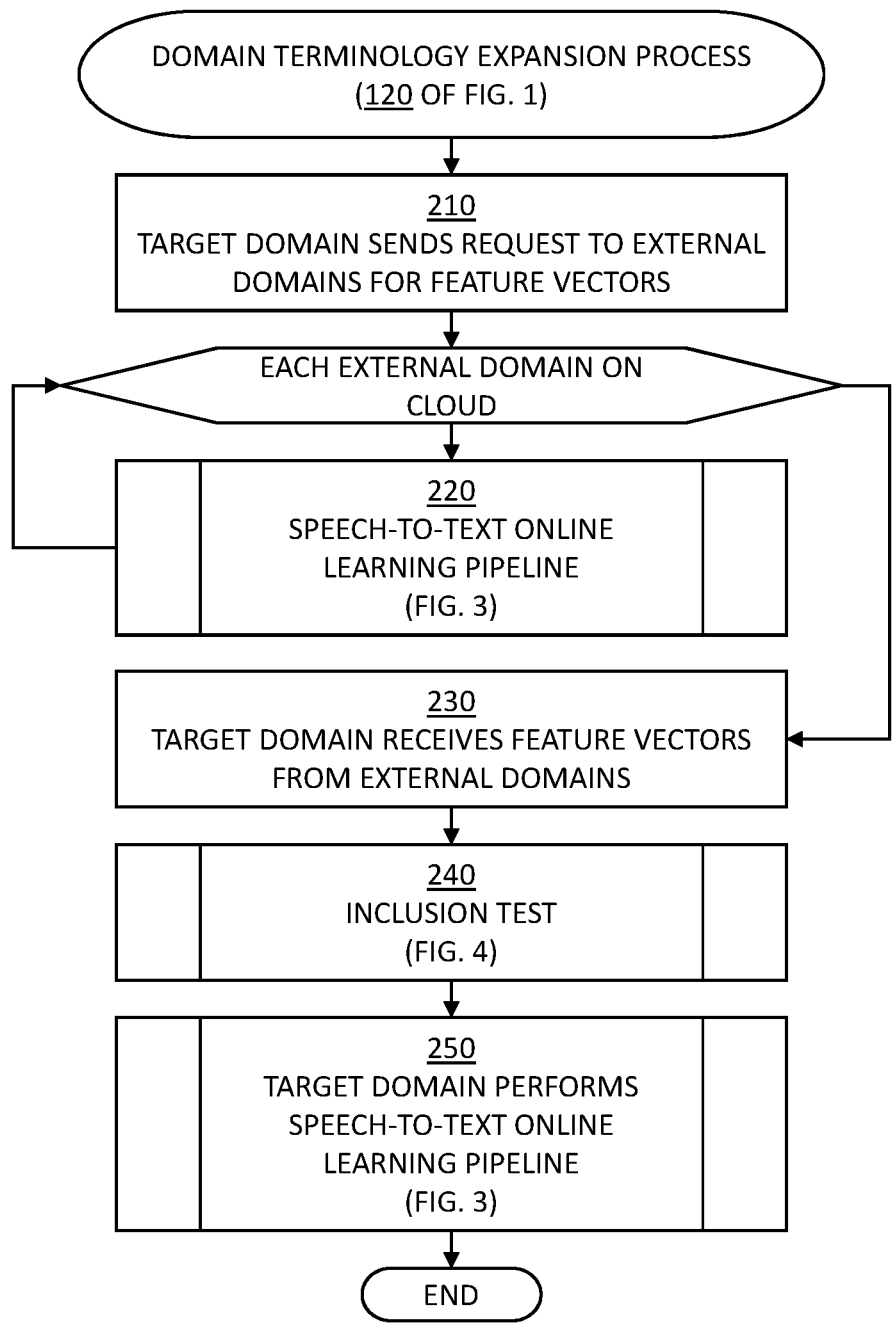
FIG. 2 depicts a flowchart performed by the domain terminology expansion process, in accordance with one or more embodiments set forth herein.

FIG. 2 depicts a flowchart performed by the domain terminology expansion process 120 of FIG. 1, in accordance with one or more embodiments set forth herein.

The domain terminology expansion process 120 is initiated by the language modeling process 170 for the target domain of the system 100, in order to expand a domain terminology corresponding to the target domain. Multiple threads of the domain terminology expansion process 120 may be concurrently operational by respective domains.

In one embodiment of the present invention, the target domain is Tennis Domain, and external domains, on the cloud 110 may be Golf Domain, Food Domain, and Politics Domain, with respectively corresponding domain terminologies.

In block 210, the domain terminology expansion process 120 sends requests to the external domains for one or more document that may be relevant to the target domain 115. The one or more document respectively includes at least one word sequence indicating a meaningful object with respect to the external domains. Such word sequence is referred to as "feature vector" in n-gram language modeling, pattern recognition and machine learning. Then the domain terminology expansion process 120 proceeds with block 220.

Figure 3:
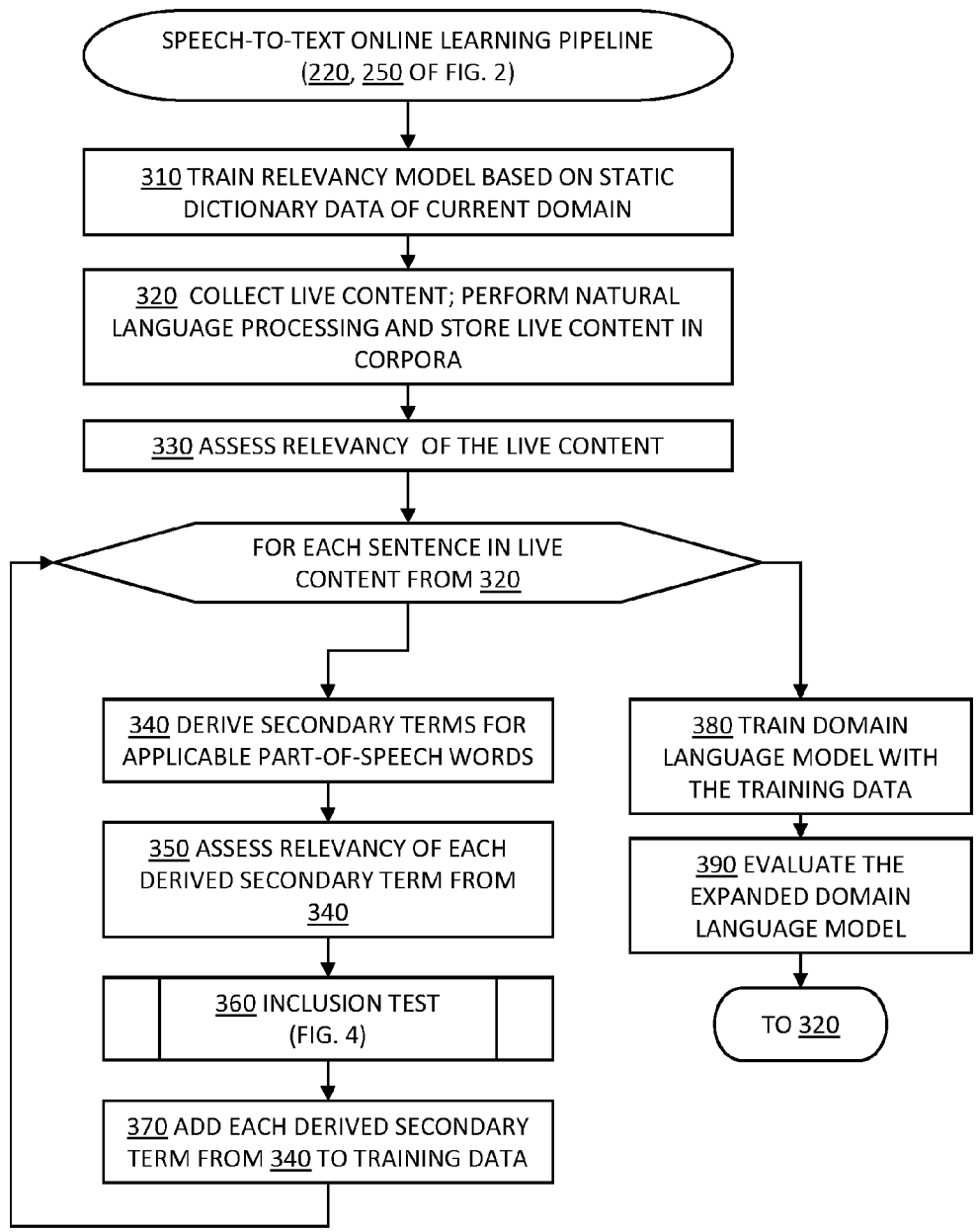
FIG. 3 depicts a detailed flowchart of the speech-to-text online learning pipeline, in accordance with one or more embodiments set forth herein.

Responsive to the request from block 210, each external domain on the cloud 110 performs the speech-to-text online learning pipeline of FIG. 3 in block 220. As a result, external domains have respective domain terminology expanded and training data have been amplified. Details on operations of the speech-to-text online learning pipeline are presented in FIG. 3 and corresponding description. Subsequent to all external domains reporting feature vectors to the target domain, the domain terminology expansion process 120 proceeds with block 230.

In block 230, the domain terminology expansion process 120 receives the feature vectors reported from the external domains as a result of running the speech-to-text online learning pipeline, respectively. The received feature vectors are meaningful for respective external domains, but may or may not be relevant to the target domain. Then the domain terminology expansion process 120 proceed with block 240.

In block 240, the domain terminology expansion process 120 performs an inclusion test, in which the domain terminology expansion process 120 determines whether or not to include the feature vectors received in block 230 in the target domain terminology based on the present configuration. Details on procedure of the inclusion test are presented in FIG. 4 and corresponding description. At the conclusion of block 240, the target terminology may be expanded with feature vectors from the external domains that had passed the inclusion test. Feature vectors that are not relevant enough for the target domain would be included only in the respective external domain as being domain dependent. Then the domain terminology expansion process 120 proceed with block 250.

In block 250, the domain terminology expansion process 120 performs the speech-to-text online learning pipeline of FIG. 3 for the target domain such that the target domain further expand the target domain terminology with live content collected on-line. Then the domain terminology expansion process 120 concludes one cycle of the domain terminology expansion operation. The domain terminology expansion process 120 may iterate blocks 210 through 250 as necessary.

FIG. 3 depicts a detailed flowchart of the speech-to-text online learning pipeline as performed in blocks 220 and 250 of FIG. 2, in accordance with one or more embodiments set forth herein.

In block 310, the domain terminology expansion process 120 creates a relevancy model based on static dictionary data of a current domain and trains the relevancy assessment process 155 of FIG. 1 for assessing/ranking relevancies of word sequences to the current domain. The relevancy model represents linguistic ontology determining whether or not a certain word sequence constitutes recognizable language of the current domain and/or lexicon of the current domain. The relevancy model is utilized in assessing relevancy of all word sequences to domain terminology of the current domain, or in ranking the word sequences in order of relevancies. Then the domain terminology expansion process 120 proceeds with block 320.

In the same embodiment of the present invention wherein the target domain is Tennis Domain, the static dictionary data of a current domain corresponds to a Tennis Dictionary in block 250. In block 220, the static dictionary data of a current domain corresponds to respective dictionaries of each external domain such as a Golf Dictionary, a Culinary Dictionary, a Politics Dictionary, etc. In certain embodiments of the present invention wherein the relevancy assessment process 150 of FIG. 1 is implemented with an external retrieval and assessment service, the relevancy model generated from the static dictionary data of the current domain is provided to the same external retrieval and assessment service as input in block 310.

In block 320, the domain terminology expansion process 120 collects live content from subject websites by crawling. The domain terminology expansion process 120 detects language of the live content as the domain terminology expansion process 120 supports a preapproved language only. If preconfigured and supported, the domain terminology expansion process 120 may automatically translate unsupported language to a supported language in order to further process the live content. The domain terminology expansion process 120 may screen grammar of the live content such that only meaningful content would be stored the live content in the corpora as a corpus for the current domain. Then the domain terminology expansion process 120 proceeds with block 330.

In the same embodiment of the present invention wherein the target domain is Tennis Domain, the subject website to be crawled may be a website for any world-renowned tennis tournament. The domain terminology expansion process 120 supports only English, and may automatically translate German and French content to English for further processing prior to storing the content to the Tennis corpus.

In block 330, the domain terminology expansion process 120 assesses relevancy of the live content to the domain terminology. Then the domain terminology expansion process 120 proceeds with block 340.

Prior to assessing relevancy of each word sequence, the domain terminology expansion process 120 calculates a term frequency-inverse document frequency (tf-idf) metric to reflect how important a word is to a document in the domain corpus, based on the static dictionary data of the current domain running the speech-to-text online learning pipeline. A retrieval and assessment service employed for certain embodiments of the present invention processes and expands the live content, extracts a language model, and builds ground truths to train a ranker for the current domain.

The domain terminology expansion process 120 performs blocks 340 through 370 as a unit for each sentence in the live content collected from block 320. In certain embodiments of the present invention, a batch of live content that had been collected for a predetermined period of time, typically a few minutes. All sentences in one batch may be processed together as a unit.

In block 340, the domain terminology expansion process 120 derive secondary terms for applicable part-of-speech words. The domain terminology expansion process 120 tokenizes, parses, then performs part-of-speech (POS) tagging on the live content by use of the natural language processing (NLP) components of the language modeling process 170. As in typical NLP applications, the domain terminology expansion process 120 handles the words in the respective base forms referred to as lemmas.

In one embodiment of the present invention, the applicable part-of-speeches are nouns and verbs. In the same embodiment, the domain terminology expansion process 120 derives hypernyms and hyponyms for nouns, and synonyms for verbs, by use of synonym network tools of WordNet and VerbNet of the Natural Language Toolkit (NLTK) 159. Then the domain terminology expansion process 120 proceeds with block 350.

In block 350, the domain terminology expansion process 120 assesses relevancies of each secondary term derived from block 340. The term "secondary term" collectively refers to hypernyms/hyponyms for nouns and synonyms for verbs. In one embodiment of the present invention, the domain terminology expansion process 120 assesses the respective relevancies of each secondary term from block 340 by going up a respective hypernym tree, and by creating feature vectors for each hypernym tree for each definition that renders the word/secondary term as related to the current domain. Then the domain terminology expansion process 120 proceeds with block 360.

Figure 4:
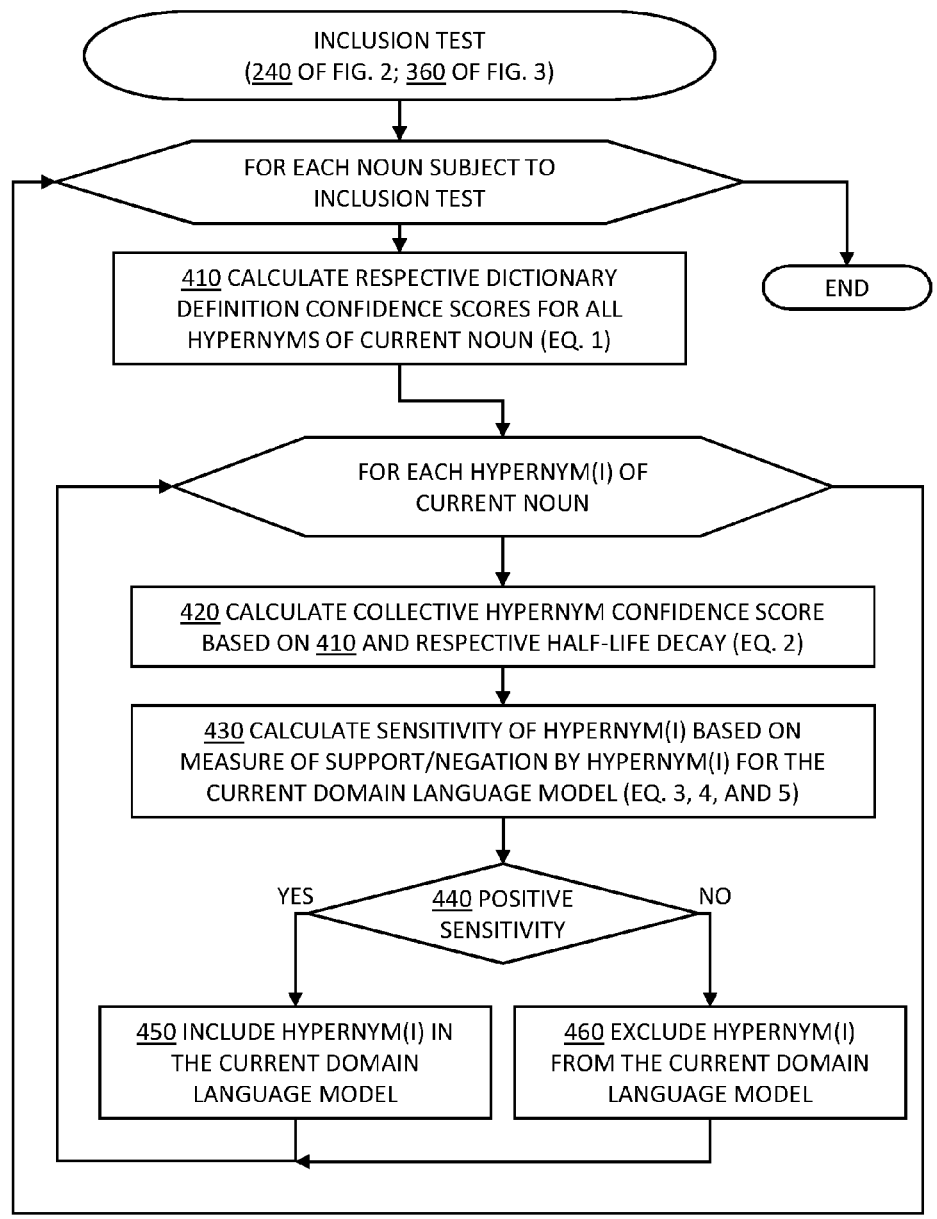
FIG. 4 depicts a detailed flowchart of the inclusion test based on confidence scores of dictionary definitions, in accordance with one or more embodiments set forth herein.

In block 360, the domain terminology expansion process 120 performs the inclusion test of FIG. 4 on the feature vectors created from block 350. The inclusion test is formulated based on respective sensitivities of secondary terms and a sensitivity threshold to determine whether or not to include the secondary terms in the corpus/language model of the current domain. If the secondary term supports the language model more than or equal to the sensitivity threshold, then the domain terminology expansion process 120 include the secondary term in the current domain corpus by updating the current domain corpus. If the sensitivity of the secondary term is less than the sensitivity threshold, then the domain terminology expansion process 120 does not update the current domain corpus with the secondary term. Then the domain terminology expansion process 120 proceeds with block 370.

In block 370, the domain terminology expansion process 120 adds the secondary terms derived in block 340 to the training data along with the corresponding relevancy metric regardless of the result of the inclusion test in block 360. One batch of the live content and the derived secondary terms are added as training data such that the training data would encompass evidences that both support and negate the language model of the current domain. Then the domain terminology expansion process 120 loops back to block 340 for the next sentence. Once the entire batch of the live content have been processed, then the domain terminology expansion process 120 proceeds with block 380.

In block 380, the domain terminology expansion process 120 trains the language model of the current domain with the training data cumulated from results of block 370 iterations. Then the domain terminology expansion process 120 proceeds with block 390.

In block 390, the domain terminology expansion process 120 evaluates the language model of the current domain as expanded with the secondary terms by use of conventional evaluation techniques such as ground truth test of the language model measured by Word Error Rates (WER), etc. Then the domain terminology expansion process 120 loops back to block 320 to process a next batch of the live content.

FIG. 4 depicts a detailed flowchart of the inclusion test based on confidence scores of dictionary definitions, as performed in block 240 of FIG. 2 and block 360 of FIG. 3; and FIG. 5 lists equations formulating the inclusion test of FIG. 4, in accordance with one or more embodiments set forth herein.

The domain terminology expansion process 120 performs blocks 410 through 460 as a unit for each noun/verb of a current feature vector. The current feature vector may be a feature vector passed from one of the external domains at block 230. The current feature vector also may be another feature vector passed within the speech-to-text online learning pipeline of the target domain, from block 350.

In block 410, the domain terminology expansion process 120 calculates a confidence score of a dictionary definition for all hypernyms of a current noun, according to EQ. 1 of FIG. 5. $S_{dd}(h_i)$ indicates the confidence score of a dictionary definition (dd) for an individual hypernym represented by i-th hypernym $h_i$.

$$S_{dd}(h_i) = \frac{\log(df_i + 1) \times \left(1 + \frac{e^{df_i}}{e^{\max(df_i)}}\right)}{\log(\max(df_i) + 1) \times 2}$$

wherein $df_i$ is a number of dictionary hits for the i-th hypernym $h_i$, $\max(df_i)$ is a maximum number of dictionary hits to be counted for a hypernym $h_i$, $$\left(1 + \frac{e^{df_i}}{e^{\max(df_i)}}\right)$$

is a growth booster, and $\log(\max(df_i)+1) \times 2$ is a norm. As the confidence score is normalized, maximum value of the confidence score is one (1). In one embodiment of the present invention $\max(df_i)$ may be configured as 265. The inclusion test is applicable for a verb, in which the domain terminology expansion process 120 may calculate the confidence scores of dictionary definitions of respective synonyms of the verb in place of the i-th hypernym $h_i$. Then the domain terminology expansion process 120 proceeds with block 420.

The domain terminology expansion process 120 performs blocks 420 through 460 as a unit for each hypernym of the current noun.

In block 420, the domain terminology expansion process 120 calculates a collective confidence score for all hypernyms of the current noun based on individual confidence scores for each hypernym and a half-life decay of each hypernym, according to EQ. 2 of FIG. 5.

$$\text{hypernym}_t = \sum_i^{|\overline{h}|} S_{dd}(h_i) \times e^{\frac{-i}{|\overline{h}|/2}}$$

wherein $$e^{\frac{-i}{|\overline{h}|/2}}$$

is a half-life decay for the i-th hypernym, that is equal to one half (½) of the number of hypernym $|\overline{h}|$. A hypernym that is closest to the current noun would get a high score. Then the domain terminology expansion process 120 proceeds with block 430.

In block 430, the domain terminology expansion process 120 calculates a sensitivity of hypernyms collectively based on measure of support and/or negation evidenced by respective hypernyms for the domain language model of the target domain, according to EQs. 3, 4, and 5 of FIG. 5.

$$negating_{LM} = \frac{1}{N} \sum_{i}^{|evd|} 1 - hypernym_i$$

represents an average measure of negation of a language model LM evidenced by |evd| number of hypernyms. Also, $$supporting_{LM} = \frac{1}{N} \sum_{i}^{|evd|} hypernym_i$$

represents an average measure of support for the language model LM evidenced by |evd|=N number of hypernyms. The language model LM may indicate language model other than the domain language model of the target domain, and for each language model adaptation, the negating and supporting scores are averaged together. A weighting metric alpha α is configured to correlate to the desired specificity of the importance of True Negatives as opposed to True Positives, and consequently a sensitivity of a language model based on the hypernym evidences are calculated as $$\alpha \times negating_{LM} + (1-\alpha) \times supporting_{LM}$$

In one embodiment of the present invention, ALPHA is configured as zero point eight (0.8) such that a hypernym that negates a language model would be weighed four times more heavily than the hypernym supports the language model. The weighing metric alpha α, and the sensitivity threshold are set based on heuristics in order to balance a desired sensitivity in minimizing False Negatives and a desired precision in minimizing False Positives. With a higher sensitivity of a language model, a hypernym that actually is irrelevant to a domain corresponding to the language model may be regarded as relevant to the domain as a False Positive, and consequently, the number of evidences |evd|=N may become greater by counting in many False Positives. Then the domain terminology expansion process 120 proceeds with block 440.

In block 440, the domain terminology expansion process 120 determines whether or not the sensitivity value calculated from block 430 is greater than or equal to a preconfigured sensitivity threshold value to include a current hypernym to the domain language model. If the domain terminology expansion process 120 determines that the sensitivity value from block 430 is greater than or equal to the preconfigured sensitivity threshold value, then the domain terminology expansion process 120 proceeds with block 450. If the domain terminology expansion process 120 determines that the sensitivity value from block 430 is less than the preconfigured sensitivity threshold value, then the domain terminology expansion process 120 proceeds with block 460.

In block 450, the domain terminology expansion process 120 includes the current hypernym in the domain language model of the current domain by updating the domain corpus in the corpora 151. Then the domain terminology expansion process 120 loops back to block 420 to process a next hypernym. If the domain terminology expansion process 120 had processed all hypernyms of the current noun, then the domain terminology expansion process 120 loops back to block 410 for a next noun subject to the inclusion test. If the domain terminology expansion process 120 had processed all nouns, then the domain terminology expansion process 120 concludes the inclusion test and return to the caller process.

In block 460, the domain terminology expansion process 120 excludes the current hypernym from the domain corpus of the current domain by refraining from updating the domain corpus in the corpora 151 with the current hypernym. Then the domain terminology expansion process 120 loops back to block 420 to process a next hypernym. If the domain terminology expansion process 120 had processed all hypernyms of the current noun, then the domain terminology expansion process 120 loops back to block 410 for a next noun subject to the inclusion test. If the domain terminology expansion process 120 had processed all nouns, then the domain terminology expansion process 120 concludes the inclusion test and return to the caller process.

In the same embodiment of the present invention as above wherein ALPHA=0.8, a THRESHOLD may be configured as zero point one five (0.15) such that a hypernym that supports a language model more than it negates the language model with an effect by the amount of the threshold (0.15) would be included in the language model. As noted above, with a lower sensitivity of the language model, the number of False Positives counted in the language model may be minimized.

Certain embodiments of the present invention may offer various technical computing advantages, including sharing of dynamic linguistic ontologies amongst multiple domains to coerce secondary terms into related or unrelated dictionaries that are related to language models. Interrelating language models for multiple domains may provide additional evidence with the current dynamic language model. Further, certain embodiments of the present invention cumulates positive and negative evidences in including a word sequence into a neighboring language model, and accordingly may expand the language model with precision driven by individual relevancy to the subject domain. Certain embodiments of the present invention adapts a language model for automatic speech recognition (ASR) or other natural language applications more accurately and more comprehensively than conventional decision based on semantic redundancy and/or ontological alignment of words, particularly with respect to disambiguation of word sequences and patterns, and accordingly may contribute in improving performances of the ASR and other natural language processing applications.

Figure 6:
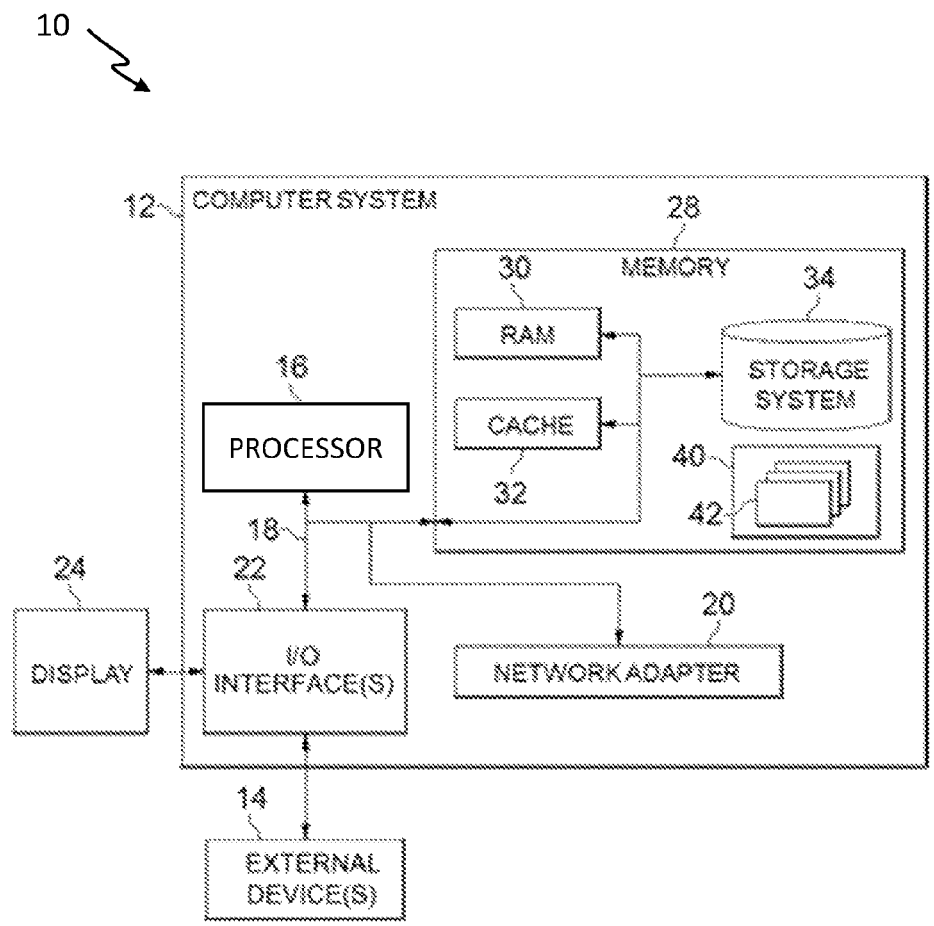
FIG. 6 depicts a cloud computing node according to an embodiment of the present invention.
Figure 7:
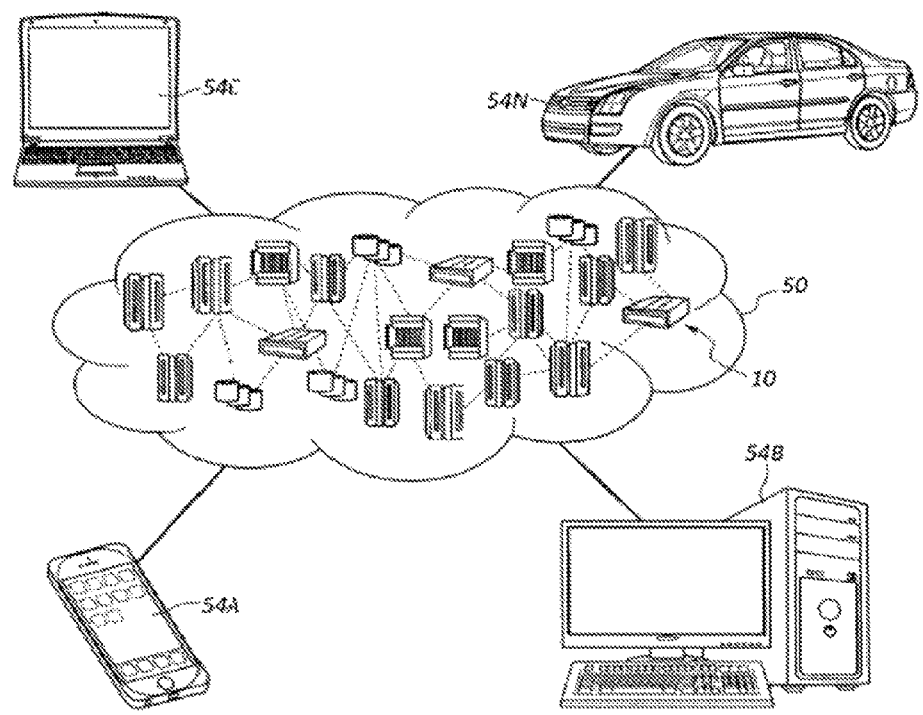
FIG. 7 depicts a cloud computing environment according to an embodiment of the present invention.
Figure 8:
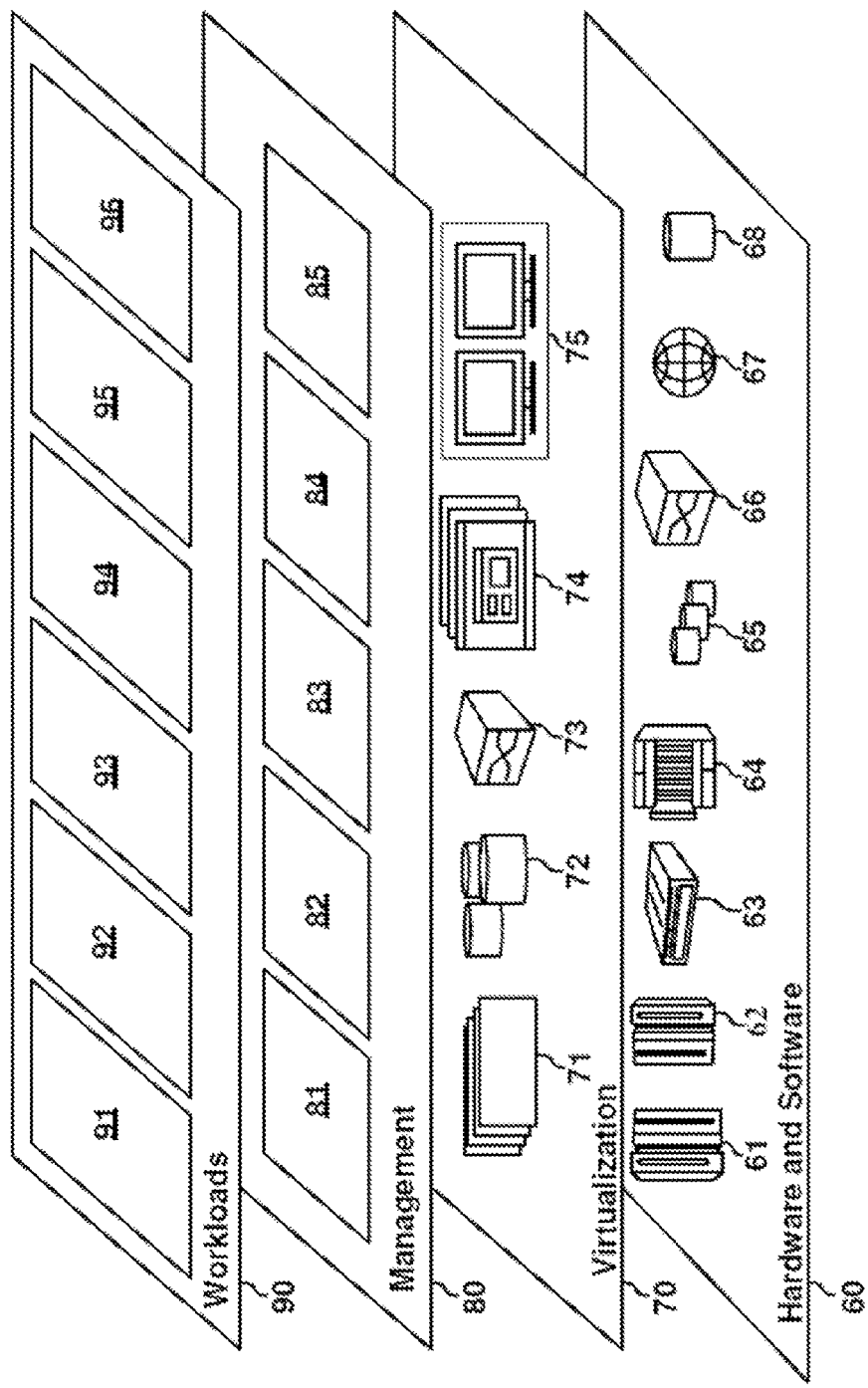
FIG. 8 depicts abstraction model layers according to an embodiment of the present invention.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the domain terminology expansion process 120 of FIG. 1. Program processes 42, as in the domain terminology expansion process 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the domain terminology expansion process 96, as described herein. The processing components 96 can be understood as one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for expanding a language model corresponding to a domain, comprising:
    determining, by one or more processor, that one or more word of a feature vector more supports than negates a language model corresponding to the domain based on a sensitivity of respective word, the determining comprising:
        (i) calculating an individual confidence score for a dictionary definition corresponding to each word of the feature vector,
        (ii) calculating a collective confidence score based on the individual confidence score for each word and a respective half-decay;
        (iii) calculating a respective sensitivity of each word as a weighted measure representing how each word supports or negates the language model, based on the collective confidence score;
        (iv) ascertaining that the sensitivity of one of each word is greater than or equal to a sensitivity threshold; and
        (v) updating the language model in the corpora by adding the one of each word from the ascertaining to the language model;
    adding the one or more word to the language model, wherein the language model is stored in a corpora coupled to a cloud;
    enhancing the language model by machine learning such that the language model accurately and comprehensively facilitates an automatic speech recognition (ASR) system for the domain; and
    performing speech recognition on a received speech input utilizing at least the enhanced language model.

2. The computer implemented method of claim 1, further comprising:
    acquiring the feature vector from one or more external domain distinctive from the domain, live content from one or more subject website in which the domain is interested, or combinations thereof, wherein the domain, the one or more external domain, and the one or more subject website are interconnected via the cloud.

3. The computer implemented method of claim 1, the enhancing comprising:
    crawling the live content from one or more subject website;
    parsing, tokenizing and tagging part-of-speech each word sequence of the live content, responsive to determining that the language of the live content is supported and that the live content is grammatically correct;
    assessing relevancy of each word sequence of the live content to the domain, wherein each word sequence includes one or more word;
    deriving the one or more secondary term from each word sequence of the live content;
    assessing relevancy of each secondary term from the deriving; and
    expanding the language model stored in the corpora with each secondary term that more supports than negates the language model, based on respective sensitivity of each secondary term and a sensitivity threshold.

4. The computer implemented method of claim 1, wherein the feature vector comprises one or more secondary terms selected from a hypernym for a noun, a synonym for a verb, and combinations thereof.

5. The computer implemented method of claim 1, further comprising:
    adding the at least one feature vector, one or more word of the live content, and the one or more secondary term, regardless of respective sensitivity corresponding to each, to training data for the language model such that the training data may encompass evidences both supporting and negating the language model for accuracy;
    training the language model by building ground truths with the training data; and
    evaluating the language model by use of evaluation techniques selected from Word Error Rate (WER), a ground truth test, and combinations thereof.

6. The computer implemented method of claim 1, further comprising:
    utilizing, by the ASR system for the domain, the language model from the expanding and the enhancing in domain-specific disambiguation and recognition of terminologies used in the domain.

7. The computer implemented method of claim 1,
    wherein the individual confidence score of a respective dictionary definition of each hypernym, represented by $S_{dd}(h_i)$, is formulated as $$S_{dd}(h_i) = \frac{\log(df_i + 1) \times \left(1 + \frac{e^{df_i}}{e^{max(df_i)}}\right)}{\log(max(df_i) + 1) \times 2},$$

wherein $df_i$ indicates a number of dictionary hits for an i-th hypernym $h_i$, $max(df_i)$ indicates a maximum number of dictionary hits to be counted for the i-th hypernym $h_i$, $$\left(1 + \frac{e^{df_i}}{e^{max(df_i)}}\right)$$

indicates a growth booster, and $\log(max(df_i)+1)\times 2$ indicates a norm, wherein the collective confidence score is formulated as $$\text{hypernym}_t = \sum_i^{|\vec{h}|} S_{dd}(h_i) \times e^{\frac{-i}{|\vec{h}|/2}},$$

wherein the respective sensitivity is formulated as $\alpha \times \text{negating}_{LM} + (1-\alpha) \times \text{supporting}_{LM}$, wherein a measure of negation of each hypernym is formulated as $$\text{negating}_{LM} = \frac{1}{N} \sum_i^{|evd|} (1 - \text{hypernym}_t),$$

wherein a measure of support of each hypernym is formulates as $$\text{supporting}_{LM} = \frac{1}{N} \sum_i^{|evd|} \text{hypernym}_t,$$

and wherein $\alpha$ indicates a weighting metric that is configured to correlate between the measure of negation and the measure of support.

8. A computer program product comprising:
a non-transitory computer readable storage medium readable by one or more processor and storing instructions for execution by the one or more processor for performing a method for expanding a language model corresponding to a domain, comprising:
determining that one or more word of a feature vector more supports than negates a language model corresponding to the domain based on a sensitivity of respective word, the determining comprising:
(i) calculating an individual confidence score for a dictionary definition corresponding to each word of the feature vector,
(ii) calculating a collective confidence score based on the individual confidence score for each word and a respective half-decay;
(iii) calculating a respective sensitivity of each word as a weighted measure representing how each word supports or negates the language model, based on the collective confidence score;
(iv) ascertaining that the sensitivity of one of each word is greater than or equal to a sensitivity threshold; and
(v) updating the language model in the corpora by adding the one of each word from the ascertaining to the language model;
adding the one or more word to the language model, wherein the language model is stored in a corpora coupled to a cloud;
enhancing the language model by machine learning such that the language model accurately and comprehensively facilitates an automatic speech recognition (ASR) system for the domain; and
performing speech recognition on a received speech input utilizing at least the enhanced language model.

9. The computer program product of claim 8, further comprising:
acquiring the feature vector from one or more external domain distinctive from the domain, live content from one or more subject website in which the domain is interested, or combinations thereof, wherein the domain, the one or more external domain, and the one or more subject website are interconnected via the cloud.

10. The computer program product of claim 8, the enhancing comprising:
crawling the live content from one or more subject website;
parsing, tokenizing and tagging part-of-speech each word sequence of the live content, responsive to determining that the language of the live content is supported and that the live content is grammatically correct;
assessing relevancy of each word sequence of the live content to the domain, wherein each word sequence includes one or more word;
deriving the one or more secondary term from each word sequence of the live content;
assessing relevancy of each secondary term from the deriving; and
expanding the language model stored in the corpora with each secondary term that more supports than negates the language model, based on respective sensitivity of each secondary term and a sensitivity threshold.

11. The computer program product of claim 8, wherein the feature vector comprises one or more secondary terms selected from a hypernym for a noun, a synonym for a verb, and combinations thereof.

12. The computer program product of claim 8, further comprising:
adding the at least one feature vector, one or more word of the live content, and the one or more secondary term, regardless of respective sensitivity corresponding to each, to training data for the language model such that the training data may encompass evidences both supporting and negating the language model for accuracy;
training the language model by building ground truths with the training data; and
evaluating the language model by use of evaluation techniques selected from Word Error Rate (WER), a ground truth test, and combinations thereof.

13. The computer program product of claim 8, further comprising:
utilizing, by the ASR system for the domain, the language model from the expanding and the enhancing in domain-specific disambiguation and recognition of terminologies used in the domain.

14. The computer program product of claim 8,
wherein the individual confidence score of a respective dictionary definition of each hypernym, represented by $S_{dd}(h_i)$, is formulated as $$S_{dd}(h_i) = \frac{\log(df_i + 1) \times \left(1 + \frac{e^{df_i}}{e^{\max(df_i)}}\right)}{\log(\max(df_i) + 1) \times 2},$$

wherein $df_i$ indicates a number of dictionary hits for an i-th hypernym $h_i$, $\max(df_i)$ indicates a maximum number of dictionary hits to be counted for the i-th hypernym $h_i$, $$\left(1 + \frac{e^{df_i}}{e^{\max(df_i)}}\right)$$

indicates a growth booster, and log(max(df$_i$)+1)×2 indicates a norm, wherein the collective confidence score is formulated as $$\text{hypernym}_t = \sum_{i}^{|\bar{h}|} S_{dd}(h_i) \times e^{\frac{-i}{|\bar{h}|/2}},$$

wherein the respective sensitivity is formulated as α×negating$_{LM}$+(1−α)×supporting$_{LM}$, wherein a measure of negation of each hypernym is formulated as $$\text{negating}_{LM} = \frac{1}{N} \sum_{i}^{|evd|} (1 - \text{hypernym}_t),$$

wherein a measure of support of each hypernym is formulates as $$\text{supporting}_{LM} = \frac{1}{N} \sum_{i}^{|evd|} \text{hypernym}_t,$$

and wherein α indicates a weighting metric that is configured to correlate between the measure of negation and the measure of support.

15. A system comprising:
a memory;
one or more processor in communication with memory; and
program instructions executable by the one or more processor via the memory to perform a method for expanding a language model corresponding to a domain, comprising:
  determining that one or more word of a feature vector more supports than negates a language model corresponding to the domain based on a sensitivity of respective word, the determining comprising:
    (i) calculating an individual confidence score for a dictionary definition corresponding to each word of the feature vector,
    (ii) calculating a collective confidence score based on the individual confidence score for each word and a respective half-decay;
    (iii) calculating a respective sensitivity of each word as a weighted measure representing how each word supports or negates the language model, based on the collective confidence score;
    (iv) ascertaining that the sensitivity of one of each word is greater than or equal to a sensitivity threshold; and
    (v) updating the language model in the corpora by adding the one of each word from the ascertaining to the language model;
  adding the one or more word to the language model, wherein the language model is stored in a corpora coupled to a cloud;
  enhancing the language model by machine learning such that the language model accurately and comprehensively facilitates an automatic speech recognition (ASR) system for the domain; and
  performing speech recognition on a received speech input utilizing at least the enhanced language model.

16. The system of claim 15, further comprising:
acquiring the feature vector from one or more external domain distinctive from the domain, live content from one or more subject website in which the domain is interested, or combinations thereof, wherein the domain, the one or more external domain, and the one or more subject website are interconnected via the cloud.

17. The system of claim 15, the enhancing comprising:
crawling the live content from one or more subject website;
parsing, tokenizing and tagging part-of-speech each word sequence of the live content, responsive to determining that the language of the live content is supported and that the live content is grammatically correct;
assessing relevancy of each word sequence of the live content to the domain, wherein each word sequence includes one or more word;
deriving the one or more secondary term from each word sequence of the live content;
assessing relevancy of each secondary term from the deriving; and
expanding the language model stored in the corpora with each secondary term that more supports than negates the language model, based on respective sensitivity of each secondary term and a sensitivity threshold.

18. The system of claim 15, wherein the feature vector comprises one or more secondary terms selected from a hypernym for a noun, a synonym for a verb, and combinations thereof.

19. The system of claim 15, further comprising:
adding the at least one feature vector, one or more word of the live content, and the one or more secondary term, regardless of respective sensitivity corresponding to each, to training data for the language model such that the training data may encompass evidences both supporting and negating the language model for accuracy;
training the language model by building ground truths with the training data; and
evaluating the language model by use of evaluation techniques selected from Word Error Rate (WER), a ground truth test, and combinations thereof.

20. The system of claim 15,
wherein the individual confidence score of a respective dictionary definition of each hypernym, represented by $S_{dd}(h_i)$, is formulated as $$S_{dd}(h_i) = \frac{\log(df_i + 1) \times \left(1 + \frac{e^{df_i}}{e^{max(df_i)}}\right)}{\log(max(df_i) + 1) \times 2},$$

wherein df$_i$ indicates a number of dictionary hits for an i-th hypernym h$_i$, max(df$_i$) indicates a maximum number of dictionary hits to be counted for the i-th hypernym h$_i$, $$\left(1 + \frac{e^{df_i}}{e^{max(df_i)}}\right)$$

indicates a growth booster, and log(max(df$_i$)+1)×2 indicates a norm, wherein the collective confidence score is formulated as $$\text{hypernym}_{t^*} = \sum_{i}^{|\bar{h}|} S_{dd}(h_i) \times e^{\frac{-i}{|\bar{h}|/2}},$$

wherein the respective sensitivity is formulated as $\alpha \times \text{negating}_{LM} + (1-\alpha) \times \text{supporting}_{LM}$, wherein a measure of negation of each hypernym is formulated as $$\text{negating}_{LM} = \frac{1}{N} \sum_{i}^{|evd|} (1 - \text{hypernym}_{t^*}),$$

wherein a measure of support of each hypernym is formulates as $$\text{supporting}_{LM} = \frac{1}{N} \sum_{i}^{|evd|} \text{hypernym}_{t^*},$$

and wherein $\alpha$ indicates a weighting metric that is configured to correlate between the measure of negation and the measure of support.

\* \* \* \* \*